(12) United States Patent
Jiang

(10) Patent No.: US 12,369,191 B2
(45) Date of Patent: Jul. 22, 2025

(54) TRANSMISSION RESOURCE INDICATION METHOD, TRANSMISSION METHOD, NETWORK DEVICE, AND TERMINAL

(71) Applicant: VIVO MOBILE COMMUNICATION CO., LTD., Guangdong (CN)

(72) Inventor: Lei Jiang, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 470 days.

(21) Appl. No.: 17/412,490

(22) Filed: Aug. 26, 2021

(65) Prior Publication Data

US 2021/0385866 A1    Dec. 9, 2021

Related U.S. Application Data

(63) Continuation of application No. PCT/CN2020/075283, filed on Feb. 14, 2020.

(30) Foreign Application Priority Data

Feb. 27, 2019  (CN) .......................... 201910147710.X

(51) Int. Cl.
*H04W 72/044*   (2023.01)
*H04L 1/1607*   (2023.01)
(Continued)

(52) U.S. Cl.
CPC ....... *H04W 74/0816* (2013.01); *H04L 1/1614* (2013.01); *H04W 72/044* (2013.01); *H04W 72/23* (2023.01)

(58) Field of Classification Search
CPC ........... H04W 74/0816; H04W 72/044; H04W 72/23; H04W 74/0808; H04W 52/0216;
(Continued)

(56) References Cited

U.S. PATENT DOCUMENTS

2015/0139175 A1*   5/2015   Ratasuk ................ H04L 5/0007
                                                                     370/330
2016/0227541 A1    8/2016   Damnjanovic et al.
(Continued)

FOREIGN PATENT DOCUMENTS

CN      105208668 A    12/2015
CN      108882376 A    11/2018
(Continued)

OTHER PUBLICATIONS

On design of downlink signals and channels for NR-U, 3GPP TSG RAN WG1 Ad-Hoc Meeting 1901, R1-1900784, Taipei, Taiwan, Jan. 21-25, 2019 (Year: 2019).*
(Continued)

*Primary Examiner* — Ayaz R Sheikh
*Assistant Examiner* — David Zhijun Sun
(74) *Attorney, Agent, or Firm* — Price Heneveld LLP

(57) ABSTRACT

This disclosure provides a transmission resource indication method, a transmission method, a network device, and a terminal. The transmission resource indication method includes: sending first indication information to a terminal, where the first indication information indicates, by using a bitmap, a transmission resource for detection by the terminal, and the transmission resource is an LBT subband of a bandwidth part BWP or a component carrier CC in carrier aggregation. By using the bitmap, the transmission resource for detection by the terminal, so that after receiving the first indication information, the terminal can perform detection on the corresponding transmission resource within the COT based on the first indication information. In this way, the number of transmission resources for detection by the terminal can be reduced, thereby reducing power consumption of the terminal.

18 Claims, 4 Drawing Sheets

Send first indication information to a terminal, where the first indication information indicates, by using a bitmap, a transmission resource for detection by the terminal, and the transmission resource is an LBT subband of a bandwidth part BWP or a component carrier CC in carrier aggregation — 201

(51) Int. Cl.
*H04W 72/23* (2023.01)
*H04W 74/0816* (2024.01)

(58) Field of Classification Search
CPC ........... H04W 52/0245; H04W 52/028; H04W 74/006; H04W 16/14; H04W 52/0209; H04W 72/0453; H04L 1/1614; H04L 5/0092; H04L 5/0053; H04L 1/0025; H04L 5/001; H04L 5/0046; H04L 5/0098; Y02D 30/70; Y02D 30/50
See application file for complete search history.

(56) References Cited

U.S. PATENT DOCUMENTS

| | | | |
|---|---|---|---|
| 2018/0098358 A1 | 4/2018 | Rico Alvarino et al. | |
| 2018/0115965 A1 | 4/2018 | Takesa et al. | |
| 2020/0267730 A1* | 8/2020 | Kim | H04W 72/0453 |
| 2021/0337582 A1* | 10/2021 | Kuang | H04W 72/044 |
| 2021/0368530 A1* | 11/2021 | Wu | H04W 72/1273 |
| 2021/0392685 A1* | 12/2021 | Myung | H04W 72/1263 |
| 2022/0141805 A1* | 5/2022 | Tooher | H04W 74/0808 370/336 |

FOREIGN PATENT DOCUMENTS

| | | |
|---|---|---|
| CN | 109392176 A | 2/2019 |
| EP | 3952529 A1 | 2/2022 |
| WO | 2016163503 A1 | 10/2016 |
| WO | 2018171413 A1 | 9/2018 |

OTHER PUBLICATIONS

Dahlman et al. 4G, LTE-Advanced Pro and The Road to 5G, Third Edition, Academic Press (2016) (Year: 2016).*
Interdigital Inc., "On design of downlink signals and channels for NR-U", 3GPP TSG RAN WG1 Ad-Hoc Meeting 1901, R1-1900784, Taipei, Taiwan, Jan. 21-25, 2019.
Huawei, Hisilicon, "HARQ enhancements in NR unlicensed," 3GPP TSG RAN WG1 Ad-Hoc Meeting 1901 R1-1900062, Taipei, Jan. 21-25, 2019 (11 pages).
Huawei, Hisilicon, HARQ enhancements in NR unlicensed, 3GPP TSG RAN WG1 Meeting #96, R1-1901527, Feb. 25-Mar. 1, 2019, Athens, Greece.
Qualcomm Incorporated, "Open Issues on CA", 3GPP TSG RAN WG1 Meeting #91, R1-1720694, Reno, NV, USA, Nov. 27-Dec. 1, 2017.
ITRI, "DL control information to facilitate wideband operation in NR-U", 3GPP TSG RAN WG1 Ad-Hoc Meeting 1901, R1-1900987, Taipei, Taiwan, Jan. 21-25, 2019.

* cited by examiner

Send first indication information to a terminal, where the first indication information indicates, by using a bitmap, a transmission resource for detection by the terminal, and the transmission resource is an LBT subband of a bandwidth part BWP or a component carrier CC in carrier aggregation ~ 201

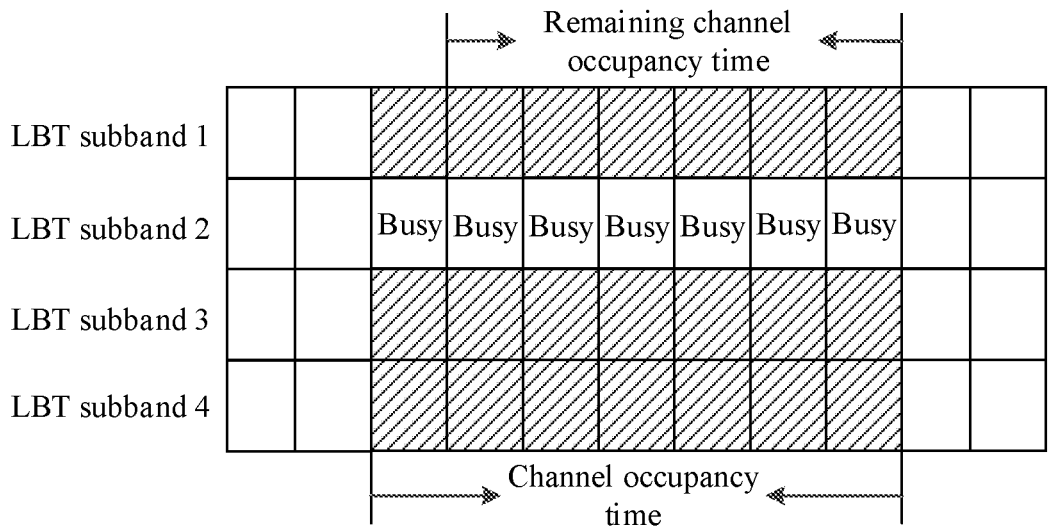

FIG. 3

```
┌─────────────────────────────────────────────────────────────┐
│ Receive first indication information sent by a network device, where │
│   the first indication information indicates, by using a bitmap, a   │──── 401
│ transmission resource for detection, and the transmission resource is│
│   an LBT subband of a bandwidth part BWP or a component carrier       │
│                     CC in carrier aggregation                         │
└─────────────────────────────────────────────────────────────┘
                              │
                              ▼
┌─────────────────────────────────────────────────────────────┐
│ After the first indication information is received within a COT of the │──── 402
│     network device, perform detection on the transmission resource     │
│           within the remaining COT of the network device               │
└─────────────────────────────────────────────────────────────┘
```

FIG. 4

TRANSMISSION RESOURCE INDICATION METHOD, TRANSMISSION METHOD, NETWORK DEVICE, AND TERMINAL

CROSS-REFERENCE TO RELATED APPLICATIONS

This application is a continuation application of International Application No. PCT/CN2020/075283 filed on Feb. 14, 2020, which claims priority to Chinese Patent Application No. 201910147710.X filed in China on Feb. 27, 2019, both disclosures of which are incorporated herein by reference in their entireties.

TECHNICAL FIELD

This disclosure relates to the field of communications technologies, and in particular, to a transmission resource indication method, a transmission method, a network device, and a terminal.

BACKGROUND

In future communications systems, unlicensed bands can serve as a supplement to licensed bands to help operators expand their services. To keep consistent with new radio (NR) deployment and maximize NR-based unlicensed access as much as possible, the unlicensed bands may operate on the 5 GHz, 37 GHz, and 60 GHz bands. High bandwidth (80 or 100 MHz) of the unlicensed bands can reduce implementation complexity of gNB and user equipment (UE). The unlicensed bands are shared by a plurality of technologies (RATs), such as Wi-Fi, radar, and LTE-LAA. Therefore, in some countries or regions, the unlicensed bands must be used in compliance with regulations, for example, observing LBT (listen before talk), maximum channel occupancy time MCOT (maximum channel occupancy time), and other rules, to ensure that all devices can fairly use the resources. When a transmission node needs to send information, LBT needs to be performed first, and energy detection (ED) is performed on surrounding nodes. When a detected power is lower than a threshold, a channel is considered to be idle, and the transmission node can perform transmission. Otherwise, the channel is considered to be busy, and the transmitting node cannot perform transmission. The transmission node may be a base station, UE, a Wi-Fi access point (AP), or the like. After the transmission node starts transmission, a channel occupancy time (COT) cannot exceed the maximum channel occupancy time MCOT.

In NR Rel-15, maximum channel bandwidth of each carrier is 400 MHz. However, considering capabilities of UE, maximum bandwidth supported by the UE may be less than 400 MHz, and the UE may operate on a plurality of small bandwidth parts (BWP). Each bandwidth part corresponds to one numerology, bandwidth, and frequency location. A base station needs to tell the UE on which BWP the UE is to operate, that is, which BWP is to be activated. A BWP may be activated or deactivated by using downlink control information (DCI) signaling. After receiving an activation or deactivation instruction, the UE performs reception or transmission on a corresponding active BWP.

On an unlicensed band, the gNB or the UE also needs to perform channel listening before performing transmission on an active BWP. When bandwidth of the BWP is greater than 20 MHz, considering coexistence with a Wi-Fi node or other nodes, bandwidth of 20 MHz is used for listening. The 20 MHz may be referred to as an LBT subband. The subband may be greater than 20 MHz as appropriate to an actual situation. For example, when minimum bandwidth of a coexisting node is 40 MHz, the LBT subband may be 40 MHz. For a BWP with high bandwidth, for example, a BWP with a bandwidth of 80 MHz, the gNB or UE needs to perform listening on four 20 MHz subbands, and then transmit data on all subbands on which a channel is detected as being idle.

In a related technology, a terminal does not know an LBT subband or a component carrier (CC) on which a network device transmits a resource. Therefore, detection needs to be performed on all subbands on which a channel is detected as being idle, including physical downlink control channel (PDCCH) blind detection, physical downlink shared channel (PDSCH) detection, discovery reference signal (DRS) detection (DRS is also referred to as discovery signal), channel state information (CSI) measurement, received signal strength indicator (RSSI) measurement, and the like. This leads to relatively large power consumption of the terminal.

SUMMARY

According to a first aspect, an embodiment of this disclosure provides a transmission resource indication method, applied to a network device and including:
  sending first indication information to a terminal, where the first indication information indicates, by using a bitmap, a transmission resource for detection by the terminal, and the transmission resource is an LBT subband of a bandwidth part BWP or a component carrier CC in carrier aggregation.

According to a second aspect, an embodiment of this disclosure further provides a transmission method, applied to a terminal and including:
  receiving first indication information sent by a network device, where the first indication information indicates, by using a bitmap, a transmission resource for detection, and the transmission resource is an LBT subband of a bandwidth part BWP or a component carrier CC in carrier aggregation; and
  after the first indication information is received within a COT of the network device, performing detection on the transmission resource within the remaining COT of the network device.

According to a third aspect, an embodiment of this disclosure further provides a network device, including:
  a sending module, configured to send first indication information to a terminal, where the first indication information indicates, by using a bitmap, a transmission resource for detection by the terminal, and the transmission resource is an LBT subband of a bandwidth part BWP or a component carrier CC in carrier aggregation.

According to a fourth aspect, an embodiment of this disclosure further provides a terminal, including:
  a receiving module, configured to receive first indication information sent by a network device, where the first indication information indicates, by using a bitmap, a transmission resource for detection, and the transmission resource is an LBT subband of a bandwidth part BWP or a component carrier CC in carrier aggregation; and
  a detection module, configured to: after the first indication information is received within a COT of the network device, perform detection on the transmission resource within the remaining COT of the network device.

According to a fifth aspect, an embodiment of this disclosure further provides a network device, including a memory, a processor, and a program stored in the memory and capable of running on the processor, where when the program is executed by the processor, the steps of the foregoing transmission resource indication method are implemented.

According to a sixth aspect, an embodiment of this disclosure further provides a terminal, including a memory, a processor, and a program stored in the memory and capable of running on the processor, where when the program is executed by the processor, the steps of the foregoing transmission method are implemented.

According to a seventh aspect, an embodiment of this disclosure further provides a computer-readable storage medium, where the computer-readable storage medium stores a program, and when the program is executed by a processor, the steps of the foregoing network device-side transmission resource indication method are implemented, or when the program is executed by a processor, the steps of the foregoing terminal-side transmission method are implemented.

BRIEF DESCRIPTION OF DRAWINGS

FIG. 3 is a schematic diagram of an LBT subband distribution status in a transmission resource indication method according to an embodiment of this disclosure;

FIG. 4 is a flowchart of another transmission resource indication method according to an embodiment of this disclosure;

DESCRIPTION OF EMBODIMENTS

The following clearly describes the technical solutions in the embodiments of this disclosure with reference to the accompanying drawings in the embodiments of this disclosure. Apparently, the described embodiments are some rather than all of the embodiments of this disclosure. All other embodiments obtained by a person of ordinary skill in the art based on the embodiments of this disclosure shall fall within the protection scope of this disclosure.

The terms "include", "comprise", and any other variants thereof in the specification and claims of this disclosure are intended to cover a non-exclusive inclusion. For example, a process, method, system, product, or device that includes a series of steps or units is not necessarily limited to those expressly listed steps or units, but may include other steps or units that are not expressly listed or are inherent to the process, method, system, product, or device. In addition, in the specification and claims, the use of "and/or" represents presence of at least one of the connected objects, for example, "A and/or B" indicates the following three cases: only A, only B, or both A and B.

In the embodiments of this disclosure, terms such as "an example" or "for example" are used to represent giving an example, an instance, or an illustration. Any embodiment or design solution described as "exemplary" or "for example" in the embodiments of this disclosure should not be construed as being more preferred or advantageous than other embodiments or design solutions. Specifically, the terms such as "an example" or "for example" are used to present related concepts in a specific manner.

The following describes the embodiments of this disclosure with reference to the accompanying drawings. An unlicensed-band transmission indication method, a network device, and a terminal that are provided in the embodiments of this disclosure may be applied to a wireless communications system. The wireless communications system may be a 5G system, an evolved long term evolution (eLTE) system, or a later evolved communications system.

Figures 1, 2:
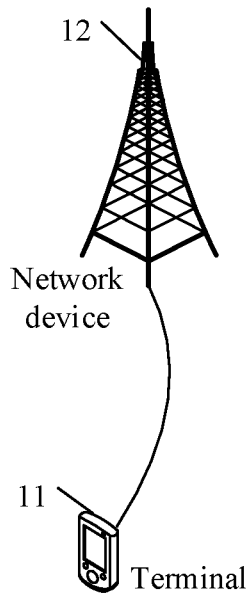
FIG. 1 is a structural diagram of a network system to which an embodiment of this disclosure may be applied.
FIG. 2 is a flowchart of a transmission resource indication method according to an embodiment of this disclosure.

FIG. 1 is a structural diagram of a network system to which an embodiment of this disclosure may be applied. As shown in FIG. 1, the network system includes a terminal 11 and a network device 12. The terminal 11 may be user equipment or other terminal side devices, for example, a terminal side device such as a mobile phone, a tablet personal computer, a laptop computer, a personal digital assistant (PDA), a mobile internet device (MID), or a wearable device. It should be noted that a specific type of the terminal 11 is not limited in this embodiment of this disclosure. The network device 12 may be a 5G base station, a base station of a later version, or a base station in other communications systems, or may be referred to as a NodeB, an evolved NodeB, a transmission reception point (TRP), an access point (AP), or other terms in the field. Provided that a same technical effect is achieved, the network device is not limited to a specific technical term. In addition, the network device 12 may be a master node (MN) or a secondary node (SN). It should be noted that, in this embodiment of this disclosure, the 5G base station is merely used as an example, but a specific type of the network device is not limited.

FIG. 2 is a flowchart of a transmission resource indication method according to an embodiment of this disclosure. The method is applied to a network device, and as shown in FIG. 2, includes the following steps.

Step 201: Send first indication information to a terminal, where the first indication information indicates, by using a bitmap, a transmission resource for detection by the terminal, and the transmission resource is an LBT subband of a bandwidth part BWP or a component carrier CC in carrier aggregation.

In this embodiment of this disclosure, the first indication information may be used to indicate a BWP resource on an unlicensed band, meaning that the BWP is on the unlicensed band, and the BWP is an active BWP of the terminal. If transmission is based on carrier aggregation (CA), the first indication information may be alternatively used to indicate a CC. Specifically, the indicated CC includes an unlicensed-band CC. In addition, in an optional embodiment, a licensed-band CC may be indicated; and in another optional embodiment, a licensed-band CC may not be indicated. In other words, the CC includes a licensed-band CC, or the CC includes no licensed-band CC.

It should be understood that, when the licensed-band CC is not indicated, the terminal needs to perform detection on the licensed-band CC.

It should be noted that the network device may indicate a same transmission resource or different transmission resources to different terminals. In addition, if the indicated transmission resource includes only an unlicensed-band resource, the transmission resource indicated by the network device to the terminal may be a full set or a subset of resources on which a channel is detected as being idle. For example, in this embodiment, when the transmission resource is the LBT subband of the BWP, the transmission resource may be all or some of LBT subbands on which a channel is detected as being idle; or when the transmission resource is the CC in carrier aggregation, the transmission resource may include all or some of unlicensed-band CCs that are in activated CCs and on which a channel is detected as being idle. In addition, when the transmission resource is the CC in carrier aggregation, the transmission resource further includes a licensed-band CC in CCs configured by the network device for the terminal.

In an optional embodiment, the detection by the terminal is channel and/or signal detection, and may specifically include at least one of physical downlink control channel PDCCH blind detection, PDSCH detection, discovery reference signal DRS detection, channel state information CSI measurement, or received signal strength indicator RSSI measurement.

In this embodiment of this disclosure, after receiving the first indication information within a Channel Occupancy Time (COT) of the network device, the terminal performs detection on the transmission resource within the remaining COT of the network device. Specifically, before receiving the first indication information, the terminal performs detection on all transmission resources; after receiving the first indication information, the terminal may perform detection on the transmission resource indicated by the first indication information within the remaining COT of the COT; and after the COT ends, the terminal performs detection on all the transmission resources again. In this embodiment, all the transmission resources are all LBT subbands of the active BWP or all activated CCs of the terminal. Detailed descriptions are provided by using an example in which the transmission resource is an LBT subband of the active BWP.

As shown in FIG. 3, the BWP has four LBT subbands, including an LBT subband 1, an LBT subband 2, an LBT subband 3, and an LBT subband 4. The network device learns, through listening, that the LBT subband 2 is in a busy state. The COT includes seven slots slot. UE 1 and UE 2 receive, in the first slot of the COT, first indication information sent by the network device. The first indication information sent by the network device to the UE 1 indicates that transmission resources for the UE 1 are the LBT subbands 3 and 4. The first indication information sent by the network device to the UE 2 indicates that transmission resources for the UE 2 are the LBT subbands 1, 3, and 4. After receiving the first indication information, the UE 1 performs channel and/or signal detection on the LBT subbands 3 and 4 within the remaining COT of the network device. After receiving the first indication information, the UE 2 performs channel and/or signal detection on the LBT subbands 1, 3, and 4 within the remaining COT of the network device. In this implementation, before the COT starts, in the first slot of the COT, and after the COT ends, both the UE 1 and the UE 2 perform channel and/or signal detection on the LBT subbands 1, 2, 3, and 4.

It should be noted that, if the network device sends new first indication information within the remaining COT of the network device, channel and/or signal detection is performed based on a transmission resource indicated by the new first indication information. For example, the network device indicates, in slot 4, to the UE 2 that transmission resources are the LBT subbands 1 and 3. In this case, the UE 2 starts to perform channel and/or signal detection on the LBT subbands 1 and 3 in slot 5, until the COT ends.

In this embodiment of this disclosure, the network device indicates, by using the bitmap, the transmission resource for detection by the terminal, so that after receiving the first indication information, the terminal can perform detection on the corresponding transmission resource within the COT based on the first indication information. In this way, the number of transmission resources for detection by the terminal can be reduced, thereby reducing power consumption of the terminal.

It should be noted that the manner of indicating the transmission resource by using the bitmap may be set according to an actual requirement. This is described in detail below.

In an implementation, the transmission resource is the LBT subband of the BWP. Specifically, the bitmap may indicate transmission states of all LBT subbands of the BWP, and each bit in the bitmap indicates whether a corresponding LBT subband is used for transmission.

In this implementation, the number of bits in the bitmap is the number of LBT subbands of the BWP or the number of LBT subbands of a BWP that has highest bandwidth and that is configured by the network device for the terminal.

In a first implementation solution, the number of bits in the bitmap is the number of LBT subbands of the BWP. If the number of LBT subbands of a currently active BWP is 2, the number of bits in the bitmap is 2; or if the number of LBT subbands of a currently active BWP is 4, the number of bits in the bitmap is 4. In this way, an amount of data transmitted can be reduced when the number of LBT subbands is small.

In a second implementation solution, the number of bits in the bitmap is the number of LBT subbands of the BWP that has the highest bandwidth and that is configured by the network device for the terminal. Specifically, the number of bits in the bitmap may be related to a BWP with highest bandwidth among BWPs configured by the network device for the terminal. For example, four BWPs configured for the terminal have bandwidth of 20 MHz, 40 MHz, 80 MHz, and 100 MHz. For example, in a case that bandwidth of the LBT subband is 20 MHz, the number of bits in the bitmap may be 5. In this way, the size of the bitmap can be fixed.

In this implementation, each bit indicates a transmission state of an LBT subband with a corresponding index, to indicate whether the corresponding LBT subband is used for transmission. As shown in FIG. 3, if the number of LBT subbands of the BWP is 4 and the number of bits in the bitmap is 4, specifically, 0 may be used to indicate that no transmission is performed, and 1 may be used to indicate that transmission is performed. If the bitmap is 0011, it may indicate that the network device does not perform transmission on the LBT subband 1, does not perform transmission on the LBT subband 2, performs transmission on the LBT subband 3, and performs transmission on the LBT subband 4. In this way, after receiving the first indication information, the terminal may perform detection only on the LBT subbands 3 and 4 within the remaining COT of the network device.

In another implementation, the transmission resource is the CC in carrier aggregation. Specifically, the bitmap indicates transmission states of all CCs configured by the network device for the terminal or all activated CCs of the terminal, and each bit in the bitmap indicates whether a corresponding CC is used for transmission.

In this embodiment, the number of bits in the bitmap may be specifically the number of all the CCs configured for the terminal, or the number of all the activated CCs of the terminal. For example, there are eight carriers for aggregation, and only CC 1 to CC 4 are activated. In this case, when the bitmap indicates all the CCs configured by the network device for the terminal, the number of bits in the bitmap is 8; or when the bitmap indicates all the activated CCs configured by the network device for the terminal, the number of bits in the bitmap is 4.

Optionally, if a CC is on a licensed band, the CC may not be indicated, so that the number of bitmaps can be reduced. Specifically, CC 1 of the four activated CCs is a licensed-band CC. In this case, CC 1 may not be indicated, or may be indicated as a transmission carrier for a gNB. When CC 1 is not indicated, the number of bits in the bitmap may be reduced to 3.

Optionally, when the transmission resource is the LBT subband of the BWP, the first indication information is carried in UE-specific DCI; or when the transmission resource is the CC in carrier aggregation, the first indication information is carried in UE-specific DCI or group common DCI.

Optionally, for a network device based on carrier aggregation, when the first indication information indicates the transmission status of the LBT subband of the BWP by using the bitmap, the sending first indication information to a terminal includes:

sending the first indication information to the terminal on a first CC or a second CC, where the first CC is a CC on which the BWP is located, and the second CC is a CC among the CCs in carrier aggregation other than the first CC; and when the first indication information is sent to the terminal on the second CC, the method further includes:

sending second indication information to the terminal on the second CC, where the second indication information indicates an index of the first CC.

It should be noted that the terminal may support one active BWP or at least two active BWPs. If the terminal supports at least two active BWPs, the network device further needs to send third indication information, where the third indication information indicates indexes of the BWPs.

In this embodiment, the second CC is a licensed-band CC or an unlicensed-band CC.

Specifically, when the first indication information and the second indication information are sent to the terminal on the second CC, the first indication information and the second indication information may be carried in downlink control information DCI scheduled by the second CC across carriers, or a preset field in DCI self-scheduled by the second CC.

To help better understand this disclosure, the following describes in detail two different implementation solutions in which the transmission resource is the LBT subband of the BWP and the transmission resource is the CC in carrier aggregation.

In a first implementation solution, the transmission resource is the LBT subband of the BWP.

Specifically, the gNB indicates an actual transmission LBT subband in the BWP to the UE. In an optional embodiment, the actual transmission LBT subband may be an LBT subband on which all channels detected by the gNB are idle, for example, the LBT subbands 1, 3, and 4 in FIG. 3. In addition, in another optional embodiment, the actual transmission LBT subband may alternatively be a subset of LBT subbands on which all channels detected by the gNB are idle. For example, for the UE 1, the gNB schedules data only on the LBT subbands 3 and 4. In this case, only the LBT subbands 3 and 4 need to be indicated to the UE 1.

The gNB performs indication to the UE by using a bitmap in DCI, where the DCI may be UE-specific DCI. Specifically, the gNB may indicate different transmission LBT subbands to UEs.

In an embodiment, a size of the bitmap may be the number of LBT subbands of a currently active BWP. For example, bandwidth of the current BWP is 80 MHz. In this case, the size of the bitmap is 4 bits. In another embodiment, a size of the bitmap may alternatively be the number of LBT subbands of a maximum BWP configured for the UE. For example, the gNB configures four BWPs for the UE, with bandwidth of 20 MHz, 40 MHz, 80 MHz, and 100 MHz. In this case, the size of the bitmap is 5 bits. An advantage of the latter is that the size of the bitmap is fixed, and does not need to change with an active BWP. Each bit indicates a status of an LBT subband with a corresponding index, that is, whether transmission is performed or no transmission is performed. For example, 1011 indicates that the LBT subbands 1, 3, and 4 in FIG. 3 are actual transmission LBT subbands.

In addition, a slot of an LBT subband may alternatively be directly indicated to the UE. When a plurality of LBT subbands need to be indicated, a manner of indication by using indexes of the LBT subbands requires a relatively large number of bits. For example, in FIG. 3, there are a total of four LBT subbands, and therefore 2 bits are required to indicate an index of each LBT subband. If transmission LBT subbands indicated by the gNB to the UE are subbands 3 and 4, the indication is 1011. If transmission LBT subbands indicated by the gNB to the UE are subbands 1, 3, and 4, the indication is 001011.

When the gNB is based on carrier aggregation and the UE has only one active BWP on each carrier, an LBT subband indication may be performed on a carrier on which the BWP is located, or on other aggregated carriers, in other words, a cross-carrier LBT subband indication may be performed. The other carriers may be unlicensed carriers or slot carriers. For a cross-carrier indication, the DCI may be DCI for performing cross-carrier scheduling for the indicated carrier, or may be a specific field in DCI self-scheduled by other carriers. The field needs to be used in combination with a carrier index indication. In other words, the gNB needs to indicate, to the UE, an index of the carrier and a transmission LBT subband of a BWP on the carrier. If the UE supports a plurality of active BWPs, corresponding BWP indexes also need to be indicated.

Optionally, the UE performs channel and/or signal detection on all subbands before receiving the LBT subband indication. After receiving the LBT subband indication transmitted by the gNB, the UE performs channel and/or signal detection only on the indicated LBT subband within the COT of the gNB. When the COT of the gNB ends, the UE performs channel and/or signal detection on all the LBT subbands again. As shown in FIG. 3, the UE receives, in the first slot of the COT of the gNB, the LBT subband indication transmitted by the gNB. Before this, all the UEs (the UE 1 and the UE 2) perform channel and/or signal detection on all the LBT subbands: the LBT subbands 1, 2, 3, and 4. After receiving the indication, the UE 1 performs channel and/or signal detection on the LBT subbands 3 and 4 and the UE 2 performs channel and/or signal detection on the LBT subbands 1, 3, and 4, according to the indication. In addition, if DCI indicates a new transmission LBT subband of the gNB within the COT of the gNB, the UE performs channel and/or signal detection on the corresponding LBT subband according to the new indication. In other words, an LBT subband on which the UE needs to perform channel and/or signal detection may be updated for a plurality of times within the COT of the gNB. After the COT of the gNB ends, the UE 1 and the UE 2 perform channel and/or signal detection on all the LBT subbands again.

In a second implementation solution, the transmission resource is the CC in carrier aggregation.

Specifically, for transmission based on carrier aggregation, to reduce channel and/or signal detections by the UE, the gNB may also indicate a transmission carrier of the gNB to the UE. The indicated transmission carrier may be all carriers on which a channel is detected as being idle, or may be a subset thereof.

For example, there are four carriers for aggregation, where a CC 1 is a primary carrier, and a CC 2 to a CC 4 are secondary carriers. If one of the carriers is on a licensed band, no indication may be performed, or the carrier may be indicated as a transmission carrier of the gNB. For example, if the primary carrier is a licensed-band carrier, the primary carrier may be ignored and not indicated, or may be always indicated as a transmission carrier of the gNB.

The transmission carrier indication may be carried in UE-specific DCI or group common DCI. The indication may be performed by using a bitmap or a CC index. When the indication is performed by using the bitmap, a size of the bitmap may be the number of all CCs configured by the gNB for the UE for carrier aggregation, or the number of actually activated CCs, or may be obtained by subtracting the number of licensed-band CCs from the foregoing two numbers.

To sum up, when four carriers are aggregated, the CC 1 is on a licensed band, and the CC 2 to the CC 4 are on an unlicensed band. The bitmap may include 4 bits that respectively represent statuses of the four carriers. A bit corresponding to the CC 1 always indicates that the carrier is a transmission carrier of the gNB. Bits corresponding to the CC 2 to the CC 4 indicate statuses of these three carriers. In addition, only 3 bits may be alternatively used to indicate the statuses of the CC 2 to the CC 4. Similarly, all gNBs may indicate a same gNB transmission carrier to all UEs, and different gNB transmission carriers may be indicated to different UEs in UE-specific DCI. If the gNB configures eight carriers for the UE and only a CC 1 to a CC 4 are activated, an 8-bit bitmap may be used for indication, and all inactivated carriers are indicated as non-gNB transmission carriers.

In addition, a slot of a carrier may be alternatively directly indicated to the UE. When a plurality of carriers on which a channel is idle need to be indicated, a manner of indication by using indexes of the carriers requires a relatively large number of bits.

Optionally, the UE performs channel and/or signal detection on all CCs before receiving the carrier indication transmitted by the gNB. After receiving the carrier indication transmitted by the gNB, the UE performs channel and/or signal detection only on the indicated carrier within the COT of the gNB. When the COT of the gNB ends, the UE performs channel and/or signal detection on all the carriers again. If no licensed-band carrier is indicated, the UE continuously performs channel and/or signal detection on a licensed band by default.

It should be noted that the foregoing embodiment is specific to downlink transmission. Similarly, for uplink transmission, a transmission LBT subband or CC of the UE may also be indicated in uplink control information (UCI) in the same manner. After receiving the indication, the gNB only needs to perform channel and/or signal detection on the indicated LBT subband or CC within a COT of the UE. At other times, the gNB performs channel and/or signal detection on all LBT subbands scheduled or configured for the UE, or the gNB performs channel and/or signal detection on all CCs scheduled or configured for the UE. For better understanding of the uplink transmission, the following uses the LBT subband as an example for description. The uplink channel and/or signal detection includes but is not limited to physical uplink control channel PUCCH detection, physical uplink shared channel PUSCH detection, sounding reference signal SRS detection, and the like.

For example, an active BWP of the UE has four LBT subbands: an LBT subband 1, an LBT subband 2, an LBT subband 3, and an LBT subband 4. The network device schedules the UE to perform uplink data transmission on the four LBT subbands. If the UE indicates a transmission resource by using a 4-bit bitmap 0001, it may indicate that the UE does not perform transmission on the LBT subband 1, does not perform transmission on the LBT subband 2, does not perform transmission on the LBT subband 3, and performs transmission on the LBT subband 4. In this way, after receiving the transmission resource indication, the network device may perform detection only on the LBT subband 4 within a remaining COT of the UE. In addition, the UE may be scheduled only on the LBT subband 4 in subsequent scheduling.

It should be understood that, for transmission based on carrier aggregation, an indication for a CC is similar to that for the LBT subband, and details are not described herein.

FIG. 4 is a flowchart of a transmission method according to an embodiment of this disclosure. The method is applied to a terminal, and as shown in FIG. 4, includes the following steps.

Step 401: Receive first indication information sent by a network device, where the first indication information indicates, by using a bitmap, a transmission resource for detection, and the transmission resource is an LBT subband of a bandwidth part BWP or a component carrier CC in carrier aggregation.

Step 402: After the first indication information is received within a COT of the network device, perform detection on the transmission resource within the remaining COT of the network device.

Optionally, the BWP is on an unlicensed band, and the BWP is an active BWP of the terminal.

Optionally, the CC includes an unlicensed-band CC.

Optionally, the CC includes a licensed-band CC or includes no licensed-band CC.

Optionally, when the CC does not include the licensed-band CC, the method further includes:

continuously performing detection on the licensed-band CC.

Optionally, the transmission resource is all or some of LBT subbands on which a channel is detected as being idle.

Optionally, the transmission resource includes all or some unlicensed-band CCs that are in CCs configured by the network device for the terminal and on which a channel is detected as being idle.

Optionally, the transmission resource further includes a licensed-band CC in the CCs configured by the network device for the terminal.

Optionally, the bitmap indicates transmission states of all LBT subbands of the BWP; and each bit in the bitmap indicates whether a corresponding LBT subband is used for transmission.

Optionally, the number of bits in the bitmap is the number of LBT subbands of the BWP or the number of LBT subbands of a BWP that has highest bandwidth and that is configured by the network device for the terminal.

Optionally, when the first indication information indicates a transmission state of an LBT subband of the BWP by using the bitmap, the receiving first indication information sent by a network device includes:

receiving, on a first CC or a second CC, the first indication information sent by the network device, where the first CC is a CC on which the BWP is located, and the second CC is a CC among the CCs in carrier aggregation other than the first CC; and when the first indication information sent by the network device is received on the second CC, the method further includes:

receiving, on the second CC, second indication information sent by the network device, where the second indication information indicates an index of the first CC.

Optionally, the second CC is a licensed-band CC or an unlicensed-band CC.

Optionally, the bitmap is used to indicate transmission states of all CCs configured by the network device for the terminal or all activated CCs of the terminal; and each bit in the bitmap indicates whether a corresponding CC is used for transmission.

Optionally, when the transmission resource is the LBT subband of the BWP, the first indication information is carried in UE-specific DCI.

Optionally, when the transmission resource is the CC in carrier aggregation, the first indication information is carried in UE-specific DCI or group common DCI.

Optionally, the performing detection on the transmission resource includes performing at least one of physical downlink control channel PDCCH blind detection, PDSCH detection, discovery reference signal DRS detection, channel state information CSI measurement, or received signal strength indicator RSSI measurement.

Optionally, the method further includes:

before the first indication information is received in the COT and after the COT ends, performing detection on all LBT subbands of the BWP or all currently activated CCs.

It should be noted that this embodiment is an implementation of the terminal corresponding to the embodiment shown in FIG. 2. For a specific implementation of this embodiment, reference may be made to the related descriptions of the embodiment shown in FIG. 2, and the same beneficial effect is achieved. To avoid repetition, details are not described herein again.

Figure 5:
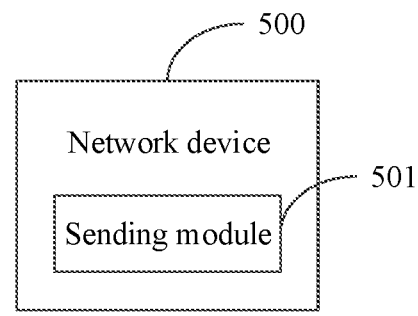
FIG. 5 shows a structure of a network device according to an embodiment of this disclosure.

FIG. 5 is a structural diagram of a network device according to an embodiment of this disclosure. As shown in FIG. 5, the network device 500 includes:

a sending module 501, configured to send first indication information to a terminal, where the first indication information indicates, by using a bitmap, a transmission resource for detection by the terminal, and the transmission resource is an LBT subband of a bandwidth part BWP or a component carrier CC in carrier aggregation.

Optionally, the BWP is on an unlicensed band, and the BWP is an active BWP of the terminal.

Optionally, the CC includes an unlicensed-band CC.

Optionally, the CC includes a licensed-band CC or includes no licensed-band CC.

Optionally, the bitmap indicates transmission states of all LBT subbands of the BWP; and each bit in the bitmap indicates whether a corresponding LBT subband is used for transmission.

Optionally, the number of bits in the bitmap is the number of LBT subbands of the BWP or the number of LBT subbands of a BWP that has highest bandwidth and that is configured by the network device for the terminal.

Optionally, when the first indication information indicates a transmission state of an LBT subband of the BWP by using the bitmap, the sending module is specifically configured to send the first indication information to the terminal on a first CC or a second CC, where the first CC is a CC on which the BWP is located, and the second CC is a CC among the CCs in carrier aggregation other than the first CC; and when the first indication information is sent to the terminal on the second CC, the sending module is further configured to:

send second indication information to the terminal on the second CC, where the second indication information indicates an index of the first CC.

Optionally, the second CC is a licensed-band CC or an unlicensed-band CC.

Optionally, the bitmap indicates transmission states of all CCs configured by the network device for the terminal or all activated CCs of the terminal; and each bit in the bitmap indicates whether a corresponding CC is used for transmission.

Optionally, when the transmission resource is the LBT subband of the BWP, the first indication information is carried in UE-specific DCI.

Optionally, when the transmission resource is the CC in carrier aggregation, the first indication information is carried in UE-specific DCI or group common DCI.

Optionally, the detection by the terminal includes at least one of physical downlink control channel PDCCH blind detection, PDSCH detection, discovery reference signal DRS detection, channel state information CSI measurement, or received signal strength indicator RSSI measurement.

The network device provided in this embodiment of this disclosure is capable of implementing the processes implemented by the network device in the method embodiment of FIG. 2. For a specific implementation of the network device, reference may be made to the related descriptions of the embodiment shown in FIG. 2, and the same beneficial effect is achieved. To avoid repetition, details are not described herein again.

Figure 6:
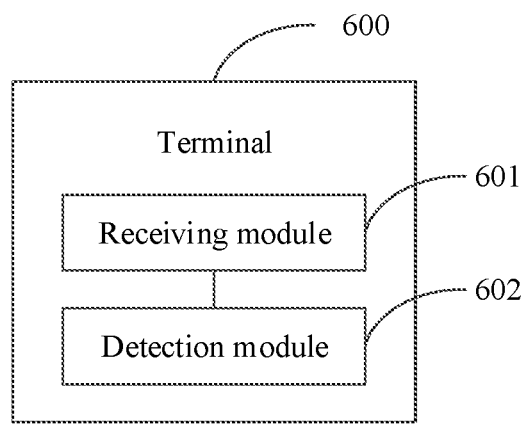
FIG. 6 shows a structure of a terminal according to an embodiment of this disclosure.

FIG. 6 is a structural diagram of a terminal according to an embodiment of this disclosure. As shown in FIG. 6, the terminal 600 includes:

a receiving module 601, configured to receive first indication information sent by a network device, where the first indication information indicates, by using a bitmap, a transmission resource for detection, and the transmission resource is an LBT subband of a bandwidth part BWP or a component carrier CC in carrier aggregation; and a detection module 602, configured to: after the first indication information is received within a COT of the network device, perform detection on the transmission resource within the remaining COT of the network device.

Optionally, the BWP is on an unlicensed band, and the BWP is an active BWP of the terminal.

Optionally, the CC includes an unlicensed-band CC.

Optionally, the CC includes a licensed-band CC or includes no licensed-band CC.

Optionally, when the CC does not include the licensed-band CC, the detection module is further configured to continuously perform detection on the licensed-band CC.

Optionally, the transmission resource is all or some of LBT subbands on which a channel is detected as being idle.

Optionally, the transmission resource includes all or some unlicensed-band CCs that are in CCs configured by the network device for the terminal and on which a channel is detected as being idle.

Optionally, the transmission resource further includes a licensed-band CC in the CCs configured by the network device for the terminal.

Optionally, the bitmap indicates transmission states of all LBT subbands of the BWP; and
each bit in the bitmap indicates whether a corresponding LBT subband is used for transmission.

Optionally, the number of bits in the bitmap is the number of LBT subbands of the BWP or the number of LBT subbands of a BWP that has highest bandwidth and that is configured by the network device for the terminal.

Optionally, when the first indication information indicates a transmission state of an LBT subband of the BWP by using the bitmap, the receiving module 601 is specifically configured to receive, on a first CC or a second CC, the first indication information sent by the network device, where the first CC is a CC on which the BWP is located, and the second CC is a CC among the CCs in carrier aggregation other than the first CC; and
when the first indication information sent by the network device is received on the second CC, the receiving module is further configured to:
receive, on the second CC, second indication information sent by the network device, where the second indication information indicates an index of the first CC.

Optionally, the second CC is a licensed-band CC or an unlicensed-band CC.

Optionally, the bitmap is used to indicate transmission states of all CCs configured by the network device for the terminal or all activated CCs of the terminal; and
each bit in the bitmap indicates whether a corresponding CC is used for transmission.

Optionally, when the transmission resource is the LBT subband of the BWP, the first indication information is carried in UE-specific DCI.

Optionally, when the transmission resource is the CC in carrier aggregation, the first indication information is carried in UE-specific DCI or group common DCI.

Optionally, the performing detection on the transmission resource includes performing at least one of physical downlink control channel PDCCH blind detection, PDSCH detection, discovery reference signal DRS detection, channel state information CSI measurement, or received signal strength indicator RSSI measurement.

Optionally, the detection module 602 is further configured to: before the first indication information is received in the COT and after the COT ends, perform detection on all LBT subbands of the BWP or all currently activated CCs.

The terminal provided in this embodiment of this disclosure is capable of implementing the processes implemented by the terminal in the method embodiment of FIG. 4. To avoid repetition, details are not described herein again.

Figure 7:
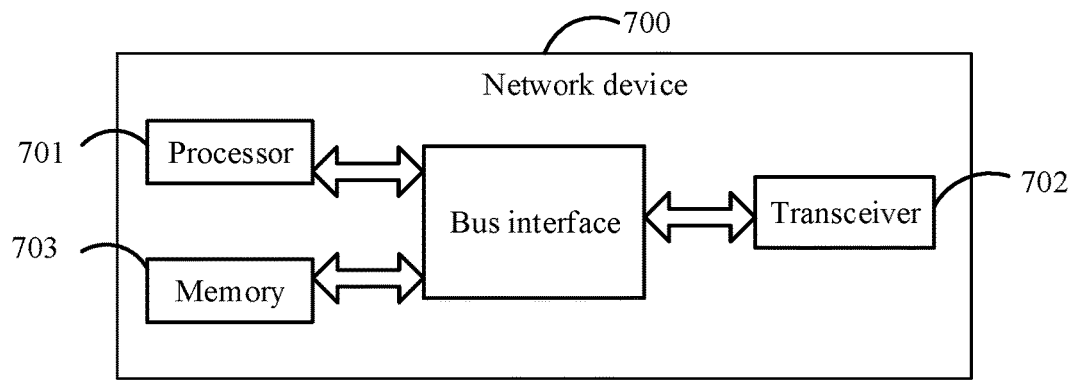
FIG. 7 shows a structure of another network device according to an embodiment of this disclosure.

FIG. 7 is a structural diagram of another network device according to an embodiment of this disclosure. As shown in FIG. 7, the network device 700 includes a processor 701, a transceiver 702, a memory 703, and a bus interface.

The transceiver 702 is configured to send first indication information to a terminal, where the first indication information indicates, by using a bitmap, a transmission resource for detection by the terminal, and the transmission resource is an LBT subband of a bandwidth part BWP or a component carrier CC in carrier aggregation.

Optionally, the BWP is on an unlicensed band, and the BWP is an active BWP of the terminal.

Optionally, the CC includes an unlicensed-band CC.

Optionally, the CC includes a licensed-band CC or includes no licensed-band CC.

Optionally, the bitmap indicates transmission states of all LBT subbands of the BWP; and
each bit in the bitmap indicates whether a corresponding LBT subband is used for transmission.

Optionally, the number of bits in the bitmap is the number of LBT subbands of the BWP or the number of LBT subbands of a BWP that has highest bandwidth and that is configured by the network device for the terminal.

Optionally, when the first indication information indicates a transmission state of an LBT subband of the BWP by using the bitmap, the transceiver 702 is specifically configured to:
send the first indication information to the terminal on a first CC or a second CC, where the first CC is a CC on which the BWP is located, and the second CC is a CC among the CCs in carrier aggregation other than the first CC; and
when the first indication information is sent to the terminal on the second CC, the transceiver 702 is further configured to:
send second indication information to the terminal on the second CC, where the second indication information indicates an index of the first CC.

Optionally, the second CC is a licensed-band CC or an unlicensed-band CC.

Optionally, the bitmap indicates transmission states of all CCs configured by the network device for the terminal or all activated CCs of the terminal; and
each bit in the bitmap indicates whether a corresponding CC is used for transmission.

Optionally, when the transmission resource is the LBT subband of the BWP, the first indication information is carried in UE-specific DCI.

Optionally, when the transmission resource is the CC in carrier aggregation, the first indication information is carried in UE-specific DCI or group common DCI.

Optionally, the detection by the terminal includes at least one of physical downlink control channel PDCCH blind detection, PDSCH detection, discovery reference signal DRS detection, channel state information CSI measurement, or received signal strength indicator RSSI measurement.

In FIG. 7, a bus architecture may include any quantity of interconnected buses and bridges, and specifically connect together various circuits of one or more processors represented by the processor 701 and a memory represented by the memory 703. The bus architecture may further interconnect various other circuits such as a peripheral device, a voltage regulator, and a power management circuit. These are all well known in the art, and therefore are not further described in this specification. The bus interface provides an interface. The transceiver 702 may be a plurality of components, including a transmitter and a receiver, and provides units for communicating with a variety of other apparatuses on a transmission medium. For different user equipments, the user interface 704 may also be an interface capable of externally or internally connecting a required device, and the connected device includes but is not limited to a keypad, a display, a speaker, a microphone, a joystick, and the like.

The processor 701 is responsible for management of the bus architecture and general processing, and the memory 703 may store data for use by the processor 701 when the processor 701 performs an operation.

Optionally, an embodiment of this disclosure further provides a network device, including a processor 701, a memory 703, and a computer program stored in the memory 703 and capable of running on the processor 701. When the computer program is executed by the processor 701, the processes of the foregoing embodiments of the transmission resource indication method are implemented, with the same technical effects achieved. To avoid repetition, details are not described herein again.

Figure 8:
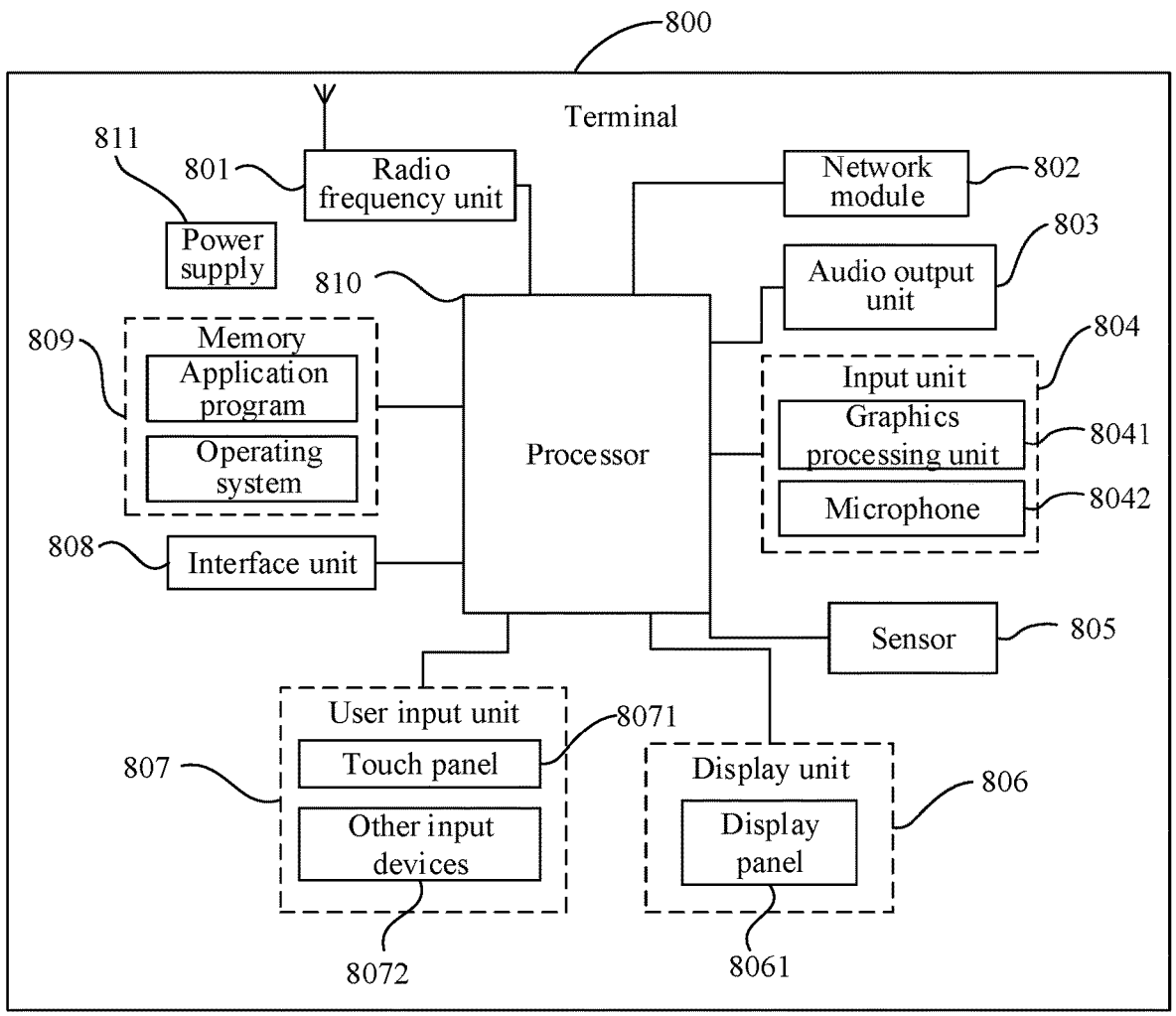
FIG. 8 shows a structure of another terminal according to an embodiment of this disclosure.

FIG. 8 is a schematic diagram of a hardware structure of a terminal for implementing the embodiments of this disclosure. The terminal 800 includes but is not limited to components such as a radio frequency unit 801, a network module 802, an audio output unit 803, an input unit 804, a sensor 805, a display unit 806, a user input unit 807, an interface unit 808, a memory 809, a processor 810, and a power supply 811. Persons skilled in the art may understand that the structure of the terminal shown in FIG. 8 does not constitute a limitation on the terminal. The terminal may include more or fewer components than those shown in the figure, or some components are combined, or component arrangements are different. In this embodiment of this disclosure, the terminal includes but is not limited to a mobile phone, a tablet computer, a laptop computer, a personal digital assistant, an in-vehicle terminal, a wearable device, a pedometer, and the like.

The radio frequency unit 801 is configured to receive first indication information sent by a network device, where the first indication information indicates, by using a bitmap, a transmission resource for detection, and the transmission resource is an LBT subband of a bandwidth part BWP or a component carrier CC in carrier aggregation.

The processor 810 is configured to: after the first indication information is received within a COT of the network device, perform detection on the transmission resource within the remaining COT of the network device.

Optionally, the BWP is on an unlicensed band, and the BWP is an active BWP of the terminal.

Optionally, the CC includes an unlicensed-band CC.

Optionally, the CC includes a licensed-band CC or includes no licensed-band CC.

Optionally, when the CC does not include the licensed-band CC, the processor 810 is further configured to:
continuously perform detection on the licensed-band CC.

Optionally, the transmission resource is all or some of LBT subbands on which a channel is detected as being idle.

Optionally, the transmission resource includes all or some unlicensed-band CCs that are in CCs configured by the network device for the terminal and on which a channel is detected as being idle.

Optionally, the transmission resource further includes a licensed-band CC in the CCs configured by the network device for the terminal.

Optionally, the bitmap indicates transmission states of all LBT subbands of the BWP; and
each bit in the bitmap indicates whether a corresponding LBT subband is used for transmission.

Optionally, the number of bits in the bitmap is the number of LBT subbands of the BWP or the number of LBT subbands of a BWP that has highest bandwidth and that is configured by the network device for the terminal.

Optionally, when the first indication information indicates a transmission state of an LBT subband of the BWP by using the bitmap, the radio frequency unit 801 is specifically configured to:
receive, on a first CC or a second CC, the first indication information sent by the network device, where the first CC is a CC on which the BWP is located, and the second CC is a CC among the CCs in carrier aggregation other than the first CC; and
when the first indication information sent by the network device is received on the second CC, the radio frequency unit 801 is further configured to:
receive, on the second CC, second indication information sent by the network device, where the second indication information indicates an index of the first CC.

Optionally, the second CC is a licensed-band CC or an unlicensed-band CC.

Optionally, the bitmap is used to indicate transmission states of all CCs configured by the network device for the terminal or all activated CCs of the terminal; and
each bit in the bitmap indicates whether a corresponding CC is used for transmission.

Optionally, when the transmission resource is the LBT subband of the BWP, the first indication information is carried in UE-specific DCI.

Optionally, when the transmission resource is the CC in carrier aggregation, the first indication information is carried in UE-specific DCI or group common DCI.

Optionally, the performing detection on the transmission resource includes performing at least one of physical downlink control channel PDCCH blind detection, PDSCH detection, discovery reference signal DRS detection, channel state information CSI measurement, or received signal strength indicator RSSI measurement.

Optionally, the processor 810 is further configured to:
before the first indication information is received in the COT and after the COT ends, perform detection on all LBT subbands of the BWP or all currently activated CCs.

It should be understood that, in this embodiment of this disclosure, the radio frequency unit 801 may be configured to transmit or receive a signal in an information transmitting/receiving or call process. Specifically, the radio frequency unit 801 receives downlink data from a base station, transmits the downlink data to the processor 810 for processing, and transmits uplink data to the base station. Generally, the radio frequency unit 801 includes but is not limited to an antenna, at least one amplifier, a transceiver, a coupler, a low noise amplifier, a duplexer, and the like. In addition, the radio frequency unit 801 may further communicate with a network and other devices via a wireless communications system.

The terminal provides the user with wireless broadband Internet access by using the network module 802, for example, helps the user send or receive an email, browse a web page, access streaming media, and the like.

The audio output unit 803 may convert audio data received by the radio frequency unit 801 or the network module 802 or stored in the memory 809 into an audio signal and output the audio signal as a sound. In addition, the audio output unit 803 may further provide audio output (for example, a call signal reception tone or a message reception tone) that is related to a specific function performed by the terminal 800. The audio output unit 803 includes a speaker, a buzzer, a receiver, and the like.

The input unit 804 is configured to receive an audio signal or a video signal. The input unit 804 may include a graphics processing unit (GPU) 8041 and a microphone 8042. The graphics processing unit 8041 processes image data of a static picture or a video obtained by an image capture apparatus (for example, a camera) in an image capture mode or a video capture mode. A processed image frame may be displayed on the display unit 806. The image frame processed by the graphics processing unit 8041 may be stored in the memory 809 (or another storage medium) or transmitted by using the radio frequency unit 801 or the network module 802. The microphone 8042 is capable of receiving sounds and processing such sounds into audio data. The processed audio data can be converted into a format output that can be transmitted to a mobile communication base station through the radio frequency unit 801 in a telephone call mode.

The terminal 800 further includes at least one sensor 805, for example, an optical sensor, a motion sensor, and another sensor. Specifically, the optical sensor includes an ambient light sensor and a proximity sensor. The ambient light sensor may adjust brightness of a display panel 8061 based on intensity of ambient light. When the terminal 800 moves near an ear, the proximity sensor may disable the display panel 8061 and/or backlight. As a motion sensor, an accelerometer sensor may detect a value of an acceleration in various directions (there are usually three axes), may detect a value and a direction of gravity when the terminal is still, and may be configured to recognize a posture of the terminal (for example, landscape/portrait mode switching, a related game, or magnetometer posture calibration), provide a function related to vibration recognition (for example, a pedometer or a keystroke), or the like. The sensor 805 may further include a fingerprint sensor, a pressure sensor, an iris sensor, a molecular sensor, a gyroscope, a barometer, a hygrometer, a thermometer, or an infrared sensor. Details are not described herein.

The display unit 806 is configured to display information input by the user or information provided to the user. The display unit 806 may include the display panel 8061. The display panel 8061 may be configured in a form of a liquid crystal display (LCD), an organic light-emitting diode (OLED), or the like.

The user input unit 807 may be configured to receive input digit or character information, and generate a key signal input related to a user setting and function control of the terminal. Specifically, the user input unit 807 includes a touch panel 8071 and other input devices 8072. The touch panel 8071, also referred to as a touchscreen, may capture a touch operation performed by a user on or near the touch panel (for example, an operation performed by the user on the touch panel 8071 or near the touch panel 8071 by using a finger or any appropriate object or accessory such as a stylus). The touch panel 8071 may include two parts: a touch detection apparatus and a touch controller. The touch detection apparatus detects a touch orientation of the user, detects a signal brought by the touch operation, and transmits the signal to the touch controller. The touch controller receives touch information from the touch detection apparatus, converts the touch information into contact coordinates, transmits the contact coordinates to the processor 810, receives a command transmitted by the processor 810, and executes the command. In addition, the touch panel 8071 may be implemented in a plurality of forms, for example, as a resistive, capacitive, infrared, or surface acoustic wave touch panel. In addition to the touch panel 8071, the user input unit 807 may further include other input devices 8072. Specifically, the other input devices 8072 may include but are not limited to a physical keyboard, a function key (such as a volume control key or a switch key), a trackball, a mouse, and a joystick. Details are not described herein.

Optionally, the touch panel 8071 may cover the display panel 8061. After detecting a touch operation on or near the touch panel 8071, the touch panel 8071 transmits the touch operation to the processor 810 to determine a type of a touch event. Then the processor 810 provides corresponding visual output on the display panel 8061 based on the type of the touch event. In FIG. 8, the touch panel 8071 and the display panel 8061 serve as two separate components to implement input and output functions of the terminal. However, in some embodiments, the touch panel 8071 and the display panel 8061 may be integrated to implement the input and output functions of the terminal. This is not specifically limited herein.

The interface unit 808 is an interface for connecting an external apparatus to the terminal 800. For example, the external apparatus may include a wired or wireless headphone port, an external power (or battery charger) port, a wired or wireless data port, a memory card port, a port for connecting an apparatus having a recognition module, an audio input/output (I/O) port, a video I/O port, an earphone port, and the like. The interface unit 808 may be configured to receive input (for example, data information and electric power) from the external apparatus, and transmit the received input to one or more elements in the terminal 800; or may be configured to transmit data between the terminal 800 and the external apparatus.

The memory 809 may be configured to store software programs and various data. The memory 809 may mainly include a program storage region and a data storage region. The program storage region may store an operating system, an application program required by at least one function (for example, an audio play function or an image play function), and the like. The data storage region may store data (for example, audio data and a phone book) created based on usage of the mobile phone. In addition, the memory 809 may include a high-speed random access memory, and may further include a non-volatile memory such as a disk storage device, a flash memory device, or another volatile solid-state storage device.

The processor 810 is a control center of the terminal, connects various parts of the entire terminal by using various interfaces and lines, and executes various functions and data processing of the terminal by running or executing a software program and/or a module stored in the memory 809 and invoking data stored in the memory 809, so as to perform overall monitoring on the terminal. The processor 810 may include one or more processing units. Optionally, an application processor and a modem processor may be integrated in the processor 810. The application processor primarily processes an operating system, user interfaces, application programs, and the like. The modem processor primarily processes radio communication. It can be understood that the modem processor may alternatively be not integrated in the processor 810.

The terminal 800 may further include a power supply 811 (for example, a battery) that supplies power to the components. Optionally, the power supply 811 may be logically connected to the processor 810 by using a power management system, so as to implement functions such as charging management, discharging management, and power consumption management by using the power management system.

In addition, the terminal 800 includes some functional modules that are not shown. Details are not described herein.

Optionally, an embodiment of this disclosure further provides a terminal, including a processor 810, a memory 809, and a computer program stored in the memory 809 and capable of running on the processor 810. When the computer program is executed by the processor 810, the processes of the foregoing transmission method embodiments are implemented, and the same technical effects can be achieved. To avoid repetition, details are not described herein again.

An embodiment of this disclosure further provides a computer-readable storage medium. The computer-readable storage medium stores a computer program. When the computer program is executed by a processor, the processes of the network device-side transmission resource indication method provided in the embodiments of this disclosure are implemented; or when the computer program is executed by a processor, the processes of the terminal-side transmission method provided in the embodiments of this disclosure are implemented, with the same technical effect achieved. To avoid repetition, details are not described herein again. For example, the computer-readable storage medium is a read-only memory (ROM), a random access memory (RAM), a magnetic disk, an optical disc, or the like.

It should be noted that in this specification, the terms "include" and "comprise", or any of their variants are intended to cover a non-exclusive inclusion, such that a process, a method, an article, or an apparatus that includes a list of elements not only includes those elements but also includes other elements that are not expressly listed, or further includes elements inherent to such a process, method, article, or apparatus. In absence of more constraints, an element preceded by "includes a . . . " does not preclude the existence of other identical elements in the process, method, article, or apparatus that includes the element.

According to the foregoing description of the implementations, a person skilled in the art may clearly understand that the methods in the foregoing embodiments may be implemented by using software in combination with a necessary common hardware platform, and certainly may alternatively be implemented by using hardware. However, in most cases, the former is a preferred implementation. Based on such an understanding, the technical solutions of this disclosure essentially, or a part contributing to the prior art may be implemented in a form of a software product. The computer software product is stored in a storage medium (for example, a ROM/RAM, a magnetic disc, or an optical disc), and includes several instructions for instructing a terminal (which may be a mobile phone, a computer, a server, an air conditioner, a base station, or the like) to perform the methods described in the embodiments of this disclosure.

The foregoing describes the embodiments of this disclosure with reference to the accompanying drawings. However, this disclosure is not limited to the foregoing specific implementation manners. The foregoing specific implementation manners are merely illustrative rather than restrictive. As instructed by this disclosure, persons of ordinary skill in the art may develop many other manners without departing from principles of this disclosure and the protection scope of the claims, and all such manners fall within the protection scope of this disclosure.

What is claimed is:

1. A transmission resource indication method, applied to a network device and comprising:
sending first indication information to a terminal, wherein the first indication information indicates, by using a bitmap, a transmission resource for detection by the terminal, and the transmission resource comprises an LBT subband of a bandwidth part (BWP);
wherein each bit in the bitmap indicates whether a corresponding LBT subband within a channel occupancy time (COT) of the network device is used for transmission;
wherein the number of bits in the bitmap is the number of LBT subbands of a BWP with the largest bandwidth that is configured for the terminal.

2. The method according to claim 1, wherein the BWP is on an unlicensed band, and the BWP is an active BWP of the terminal.

3. The method according to claim 1, wherein the bitmap indicates transmission states of all LBT subbands of the BWP.

4. The method according to claim 1, wherein when the first indication information indicates a transmission state of an LBT subband of the BWP by using the bitmap, the sending first indication information to a terminal comprises:
sending the first indication information to the terminal on a first CC or a second CC, wherein the first CC is a CC on which the BWP is located, and the second CC is a CC among the CCs in carrier aggregation other than the first CC; and
when the first indication information is sent to the terminal on the second CC, the method further comprises:
sending second indication information to the terminal on the second CC, wherein the second indication information indicates an index of the first CC;
wherein the second CC is a licensed-band CC or an unlicensed-band CC.

5. The method according to claim 1, wherein the BWP is on an unlicensed band, and the BWP is a first active BWP of the terminal;
wherein when the first indication information indicates a transmission state of an LBT subband of the BWP by using the bitmap, the sending first indication information to a terminal comprises:
sending the first indication information to the terminal on a second CC, wherein a first CC is a CC on which the BWP is located, and the second CC is a CC among the CCs in carrier aggregation other than the first CC; and
wherein the method further comprises:
sending second indication information to the terminal on the second CC, wherein the second indication information indicates an index of the first CC and an index of the first active BWP;
wherein the second CC is a licensed-band CC or an unlicensed-band CC.

6. The method according to claim 2, wherein when the transmission resource comprises an LBT subband of the BWP, the first indication information is carried in UE-specific downlink control information DCI.

7. The method according to claim 1, wherein the detection by the terminal comprises at least one of physical downlink control channel (PDCCH) blind detection, physical downlink shared channel (PDSCH) detection, discovery reference signal (DRS) detection, channel state information (CSI) measurement, or received signal strength indicator (RSSI) measurement.

8. A transmission method, applied to a terminal and comprising:
receiving first indication information sent by a network device, wherein the first indication information indicates, by using a bitmap, a transmission resource for detection, and the transmission resource is an LBT subband of a bandwidth part (BWP); wherein each bit in the bitmap indicates whether a corresponding LBT subband within a remaining channel occupancy time (COT) of the network device is used for transmission; and after the first indication information is received, performing detection on the transmission resource within the remaining COT of the network device;

wherein the number of bits in the bitmap is the number of LBT subbands of a BWP with the largest bandwidth that is configurable for the terminal.

9. The method according to claim 8, wherein the BWP is on an unlicensed band, and the BWP is an active BWP of the terminal.

10. The method according to claim 8, wherein the transmission resource comprises all or some of LBT subbands on which a channel is detected as being idle.

11. The method according to claim 8, wherein the bitmap indicates transmission states of all LBT subbands of the BWP.

12. The method according to claim 8, wherein when the first indication information indicates a transmission state of an LBT subband of the BWP by using the bitmap, the receiving first indication information sent by a network device comprises:

receiving, on a first CC or a second CC, the first indication information sent by the network device, wherein the first CC is a CC on which the BWP is located, and the second CC is a CC among the CCs in carrier aggregation other than the first CC; and when the first indication information sent by the network device is received on the second CC, the method further comprises:

receiving, on the second CC, second indication information sent by the network device, wherein the second indication information indicates an index of the first CC.

13. The method according to claim 8, wherein when the transmission resource is the LBT subband of the BWP, the first indication information is carried in UE-specific downlink control information (DCI).

14. The method according to claim 8, further comprising:
before the first indication information is received in the COT and after the COT ends, performing detection on all LBT subbands of the BWP or all currently activated CCs.

15. A terminal, comprising a memory, a processor, and a program stored in the memory and capable of running on the processor, wherein the program is executed by the processor to implement:

receiving first indication information sent by a network device, wherein the first indication information indicates, by using a bitmap, a transmission resource for detection, and the transmission resource is an LBT subband of a bandwidth part (BWP); wherein each bit in the bitmap indicates whether a corresponding LBT subband within a remaining channel occupancy time (COT) of the network device is used for transmission; and after the first indication information is received, performing detection on the transmission resource within the remaining COT of the network device;

wherein the number of bits in the bitmap is the number of LBT subbands of a BWP with the largest bandwidth that is configurable for the terminal.

16. The terminal according to claim 15, wherein when the first indication information indicates a transmission state of an LBT subband of the BWP by using the bitmap, the program is further executed by the processor to implement:

receiving, on a first CC or a second CC, the first indication information sent by the network device, wherein the first CC is a CC on which the BWP is located, and the second CC is a CC among the CCs in carrier aggregation other than the first CC; and when the first indication information sent by the network device is received on the second CC, the method further comprises:

receiving, on the second CC, second indication information sent by the network device, wherein the second indication information indicates an index of the first CC.

17. The terminal according to claim 15, wherein the bitmap indicates transmission states of all LBT subbands of the BWP.

18. The terminal according to claim 15, wherein the program is further executed by the processor to implement:
before the first indication information is received in the COT and after the COT ends, performing detection on all LBT subbands of the BWP or all currently activated CCs.

* * * * *